United States Patent [19]

Ise

[11] Patent Number: 4,878,737
[45] Date of Patent: Nov. 7, 1989

[54] OPTICAL LOW-PASS FILTER

[75] Inventor: Koichi Ise, Chiba, Japan

[73] Assignee: Sony Corp., Tokyo, Japan

[21] Appl. No.: 133,788

[22] Filed: Dec. 16, 1987

[30] Foreign Application Priority Data

Dec. 24, 1986 [JP] Japan .................... 61-313859

[51] Int. Cl.⁴ .................................. G02B 27/00
[52] U.S. Cl. .................................. 350/167; 358/44; 358/331
[58] Field of Search ............... 350/167; 358/331, 47, 358/44

[56] References Cited

U.S. PATENT DOCUMENTS

| | | | |
|---|---|---|---|
| 3,756,695 | 9/1973 | Mino et al. | 358/44 |
| 3,768,888 | 10/1973 | Nishino et al. | 358/47 |
| 3,910,683 | 10/1975 | Nishino et al. | 358/44 |
| 4,009,939 | 3/1977 | Okano | 358/44 |
| 4,472,735 | 9/1984 | Shinozaki et al. | 350/167 |

Primary Examiner—Rodney B. Bovernick
Assistant Examiner—Terry S. Callaghan
Attorney, Agent, or Firm—Alvin Sinderbrand

[57] ABSTRACT

An optical low-pass filter for use in the optical system of a color video camera has first and second periodic structures on the same or opposed major surfaces of a transparent substrate and which are dimensioned and arranged in respect to each other to provide a modulation transfer function, in at least the horizontal scanning direction of the camera, which is higher than a predetermined value for frequencies in a range lower than a cut-off spatial frequency and which is low over a range of frequencies extending from the cut-off spatial frequency to substantially more than twice said cut-off spatial frequency.

7 Claims, 2 Drawing Sheets

OPTICAL LOW-PASS FILTER

BACKGROUND OF THE INVENTION

1. Field of the Invention

This invention relates generally to optical low-pass filters, and more particularly is directed to an optical low-pass filter for use in the optical system of a color video camera which is of a single tube-type or which uses a solid state imager or the like.

2. Description of the Prior Art

In a single tube-type color video camera having a stripe-shaped color separation filter, or in a color video camera having a solid state imager, a camera output is obtained by optically spatially sampling the image of an object projected onto the pick-up device. In such a color video camera, the resolution or fineness of a picture pattern which can be handled is dependent on the sampling frequency. If the projected image contains a spatial frequency component higher than the sampling frequency, a false color signal or moire pattern results. When an image of the object in the field of view of the camera is formed on the stripe-shaped color separation filter and contains a frequency component which is the same as the spatial frequency of the stripe-shaped color separation filter, such frequency component causes a false signal to be produced which results in a reproduced picture having a color inconsistent with that of the original object.

For the reasons given above, the image pick-up optical system of a color video camera needs an optical low-pass filter which limits or restricts the high spatial frequency component of the image of an object in the field of view of the camera.

Some existing optical low-pass filters employ the birefringence or double refraction of crystalline materials, such as, calcite, quartz and the like. Such optical low-pass filters employing the birefringence of crystalline materials are adapted to selectively decrease the resolution of the frequency component of the image which is the same as the spatial frequency of the stripe-shaped color separation filter, while maintaining the highest resolution of the image in respect to the frequency band thereof which is lower than the spatial frequency of the stripe-shaped color separation filter. Further, optical low-pass filters employing the birefringence of crystalline materials can have the optical low-pass filter characteristics thereof varied by selecting or changing the thickness of the crystalline material or plate that is used therefore. However, since the crystalline material is expensive and a solid state imager requires several crystal plates, optical low-pass filters employing the birefringence of crystalline materials are uneconomical and present difficulties in their manufacture so as to be unsuitable for mass production.

Therefore, it has been proposed to use a phase noise type optical low-pass filter formed of a plastic material or the like, for example, as described in the article entitled "Spatial-Frequency Filter for a Kell-Type Color Camera", by R. L. Townsend, in Applied Optics, November 1972, volume 11, number 11, pages 2463 to 2472. In view of the fact that autocorrelation of the pupil function in a focusing optical system provides a modulation transfer function (MTF) of such optical system, an optical low-pass filter of the phase noise type obtains a desired characteristic by positively imparting wave front aberration to the pupil function. For example, by inserting into the optical system a transparent substrate on which a stripe-shaped thin film provides a phase difference, the phase term of the pupil function is varied so as to impart an optical low-pass filter characteristic thereto.

An optical low-pass filter for use in the optical system of a color video camera has to satisfy the following conditions:

(1) the MTF must be high in the frequency range below the cut-off spatial frequency so as to provide high contrast; and (2) the MTF must be low over a relatively wide range of frequencies extending upwardly from the cut-off spatial frequency so as to minimize the false signal.

However, conventional phase noise type optical low-pass filters cannot satisfy the above requirements for an optical low-pass filter to be used in the optical system of a color video camera. Therefore, persons employed by the assignee of the present application and having an obligation to assign thereto, have previously proposed, for example, as disclosed specifically in Japanese laid-open Patent Application No. 61-126532, published June 14, 1986, a phase noise type optical low-pass filter having an improved periodic structure and an MTF characteristic which substantially satisfies the above noted requirements. More particularly, in such previously proposed phase noise type optical low-pass filter having an improved periodic structure and MTF characteristic, the MTF is suitably high for frequencies in a range lower than the cut-off spatial frequency which is the lowest frequency at which the MTF is zero, and the MTF remains low over a relatively wide range of frequencies extending from the cut-off spatial frequency to the next higher frequency at which the MTF becomes zero a second time. However, the MTF rises sharply at the higher spatial frequencies, that is, frequencies greater than that at which the MTF becomes zero a second time.

Such sharply increasing MTF at the higher spatial frequencies causes problems for certain kinds of imagers and color separation filters. More particularly, in a color video camera with a zoom lens, a false signal is made conspicuous when the zoom lens is operated so that it is necessary to provide a phase noise type optical low-pass filter with a further improved MTF characteristic, particularly for the higher spatial frequencies.

OBJECTS AND SUMMARY OF THE INVENTION

Accordingly, it is an object of the present invention to provide an optical low-pass filter which avoids the above mentioned problems encountered with the prior art.

More specifically, it is an object of this invention to provide an optical low-pass filter, particularly for use in the optical system of a color video camera, and which provides a modulation transfer function in at least one direction, for example, the horizontal scanning direction of the camera, which is higher than a predetermined value for frequencies in a range lower than a cut-off spatial frequency and which is low over an increased range of frequencies extending upwardly from the cut-off spatial frequency.

Another object is to provide an optical low-pass filter, as aforesaid, in which the increased range of frequencies over which the MTF is low extends from the cut-off spatial frequency to substantially more than twice the cut-off spatial frequency.

A further object of this invention is to provide an optical low-pass filter for use in the optical system of a color video camera, as aforesaid, and which can provide a picture of high contrast while minimizing the occurrence of false signals.

According to an aspect of the present invention, an optical low-pass filter, particularly for use in the optical system of a color video camera, comprises at least first and second periodic structures, for example, on the same or opposed major surfaces of a transparent substrate interposed in the optical system, and which are dimensioned and arranged in respect to each other to provide an MTF in at least one direction, for example, the horizontal scanning direction of the camera, which is higher than a predetermined value for frequencies in a range lower than a cut-off spatial frequency and which is low over a range of frequencies extending from said cut-off spatial frequency to substantially more than twice said cut-off spatial frequency.

In accordance with another aspect of the invention, the first and second periodic structures have different effective periodic lengths measured in at least one direction, for example, the horizontal scanning direction. In this respect, the first and second periodic structures may have respective first and second axes which are angularly displaced from each other and from the horizontal scanning direction so as to provide the different effective periodic lengths measured in the horizontal scanning direction even though the first and second periodic structures have the same periodic lengths measured in the directions of the first and second axes, respectively, or the first and second periodic structures may extend parallel to each other at an angle to the horizontal scanning direction and have different periodic lengths measured transversely to the first and second periodic structures, respectively.

The above, and other objects, features and advantages of the present invention, will be apparent in the following detailed description of preferred embodiments thereof when read in connection with the accompanying drawings in which corresponding parts are identified by the same reference numerals in the several views.

DESCRIPTION OF PREFERRED EMBODIMENTS

In order that the present invention may be fully understood, reference will first be made FIG. 1 which illustrates the MTF characteristic of a previously proposed phase noise type optical low-pass filter, for example, as disclosed in the earlier referred to Japanese Laid-Open Patent Application No. 61-126532. It will be seen from FIG. 1 that the MTF of such previously proposed phase noise type optical low-pass filter is high for frequencies in a range lower than a cut-off spatial frequency $f_c$, and further that the MTF is low over a range of frequencies from the cut-off spatial frequency $f_c$ to a frequency $f_d$ at which the MTF is zero for the second time. However, for frequencies above the value $f_d$, the MTF rises sharply and this creates a serious problem in that, when the previously proposed phase noise type optical low-pass filter is employed in the optical system of a color video camera having a zoom lens, conspicuous false signals appear when the zoom lens is operated.

The manner in which the MTF of a phase noise type optical low-pass filter can be determined and the relation of the periodic length of a periodic structure or phase grating to the MTF are well understood to persons skilled in the art, as is apparent from the description thereof in the article entitled "Spatial-Frequency Filter for a Kell-Type Color Camera", by R. L. Townsend, and which has been previously more fully identified herein.

Figure 2:
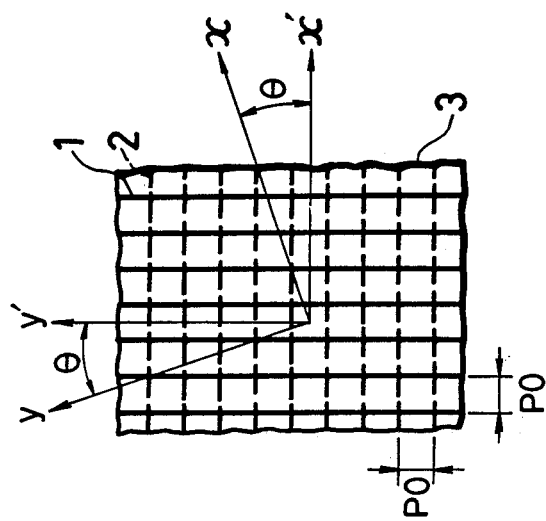
FIG. 2 is a schematic illustration of an optical low-pass filter according to an embodiment of the present invention.

Referring now to FIG. 2, it will be seen that an optical low-pass filter according to an embodiment of the present invention generally comprises a first periodic structure 1 shown in full lines and having a periodic length or pitch $P_0$ measured in the direction of a first axis x', and a second periodic structure 2 shown in dot/dash lines and having the same periodic length or pitch $P_0$ measured in the direction of a second axis y'. The first and second periodic structures 1 and 2 are provided perpendicular to each other on opposed first and second major surfaces, respectively, of a transparent substrate 3. For the sake of this description, it will be assumed that the periodic structures 1 and 2 considered independently of each other have MTF characteristics in the directions of the axes x' and y', respectively, that are each the same as the MTF characteristic shown on FIG. 1. However, in accordance with the present invention, the periodic structures 1 and 2 are arranged to have different effective periodic lengths or pitches measured in at least the direction x on FIG. 2 which may, for example, represent the horizontal scanning direction of a color video camera with which the optical low-pass filter embodying this invention is associated.

More specifically, in the embodiment of the present invention shown on FIG. 2, the first and second periodic structures 1 and 2 having orthogonally related axes x' and y', respectively, and equal periodic lengths $P_0$ are angularly displaced, as installed in the optical system of the color video camera, so as to provide an angle $\theta$ between the axis x' of the periodic structure 1 and the horizontal scanning direction x, and similarly an angle $\theta$ between the axis y' of the periodic structure 2 and the vertical direction y at right angles to the horizontal scanning direction x. By reason of such angular displacement of the periodic structures 1 and 2 in respect to the horizontal scanning direction x and the vertical direction y, the effective pitch $P_1$ of the periodic structure 1 measured in the horizontal scanning direction x is:

$$P_1 = P_0/\cos\theta$$

The MTF characteristic of the periodic structure 1 in the horizontal scanning direction x displaced by the angle θ from the axis x′ provides $f_{1c} = f_c/\cos\theta$ and $f_{1d} = f_d/\cos\theta$ in which $f_{1c}$ is the cut-off spatial frequency of the MTF in the direction x and $f_1d$ is the frequency at which such MTF is zero for the second time. As is indicated by the solid line a on FIG. 3, the MTF characteristic in the direction x of the periodic structure 1 considered alone is similar in shape to the MTF characteristic of the optical low-pass filter according to the prior art as shown on FIG. 1.

The effective pitch $P_2$ of the periodic structure 2 also measured in respect to the horizontal scanning direction x is similarly expressed as $P_2 = P_0/\sin\theta$.

Therefore, the MTF characteristic of the periodic structure 2 in the horizontal scanning direction x results in $f_{2c} = f_c/\sin\theta$ and $f_{2d} = f_d/\sin\theta$
in which $f_{2c}$ is the cut-off spatial frequency of the MTF in the direction x and $f_{2d}$ is the frequency at which such MTF becomes zero for the second time. The MTF characteristic in the direction x for the periodic structure 2 considered alone is indicated by the dashed line b on FIG. 3 for the case in which the angle θ is 25°.

Figure 3:
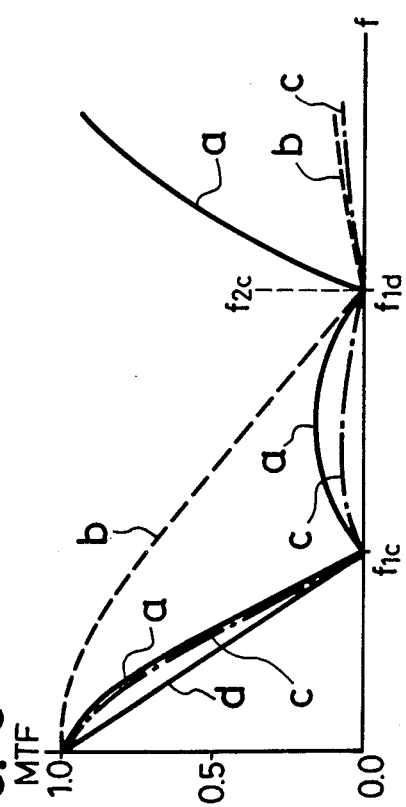
FIG. 3 is a graph similar to that of FIG. 1, but to which reference will be made in explaining the operation of the optical low-pass filter shown in FIG. 2.

The MTF characteristic in the direction x for the synthesized periodic structures 1 and 2, that is, for such periodic structures considered together, is calculated from the pupil function, and is represented by the dot-dash line c on FIG. 3. Comparing the MTF characteristic indicated at c on FIG. 3 with that shown on FIG. 1, it will be apparent that the MTF characteristic in the frequency range up to the cut-off spatial frequency $f_{1c}$ is substantially the same as that in the frequency range 0 to $f_c$ on FIG. 1. However, the MTF characteristic c on FIG. 3 has a much wider range above the cut-off spatial frequency in which the MTF remains low. More particularly, in the MTF characteristic according to the prior art, as shown on FIG. 1, the MTF remains low only in the band of frequencies between the cut-off spatial frequency $f_c$ and the frequency $f_d$ at which the MTF becomes zero for the second time, with the MTF rising sharply for frequencies above the value $f_d$. On the other hand, in the MTF characteristic c of an optical low-pass filter embodying the present invention, as shown on FIG. 3, the MTF remains low in the frequency range extending substantially above the frequency at which the MTF becomes zero for the second time, and which is indicated at $f_{1d}$ or $f_{2c}$ on FIG. 3.

It will further be apparent from FIG. 3 that, in the optical low-pass filter according to this invention illustrated by FIG. 2, the MTF of the periodic structure 1 is dominant in the frequency range from 0 to $f_{1d}$, while the MTF of the periodic structure 2 is dominant in the frequency range above the frequency $f_{1d}$. Thus, the periodic structures 1 and 2 cooperate with each other to provide an improved synthesized MTF characteristic in the horizontal scanning direction x.

The MTF characteristic in the direction y, that is, in the vertical direction at right angles to the horizontal scanning direction x of the associated color video camera, can be established by interchanging the roles of the periodic structures 1 and 2 as considered in the direction x. In other words, the MTF characteristic of the periodic structure 1 in the direction y becomes that indicated in the dashed line at b on FIG. 3, the MTF characteristic of the periodic structure 2 in the direction Y becomes that indicated by the solid line a on FIG. 3, and the composite or synthesized MTF characteristic in the direction y resulting from synthesizing the periodic structures 1 and 2 becomes that indicated by the dot dash line c on FIG. 3. Therefore, the MTF characteristic of the optical low-pass filter according to the embodiment of the invention shown on FIG. 2 is the same in the direction y as in the direction x. However, in the case of the MTF characteristic in the direction y, the periodic structure 2 is dominant for frequencies from 0 to the frequency indicated at $f_{1d}$ or $f_{2c}$ at which the MTF becomes zero for the second time, while the MTF of the periodic structure 1 in the direction y is dominant for frequencies greater than the frequency indicated at $f_{1d}$ or $f_{2c}$.

In other words, the periodic structures 1 and 2 having different effective periodic lengths or pitches as measured in the directions x and y, complement each other so as to improve the MTF characteristics in both the directions x and y. The directions x and y are selected for their importance in respect to the picture structure. For example, as earlier indicated, the directions x and y may desirably be the horizontal scanning direction and the vertical direction perpendicular thereto.

Figure 1:
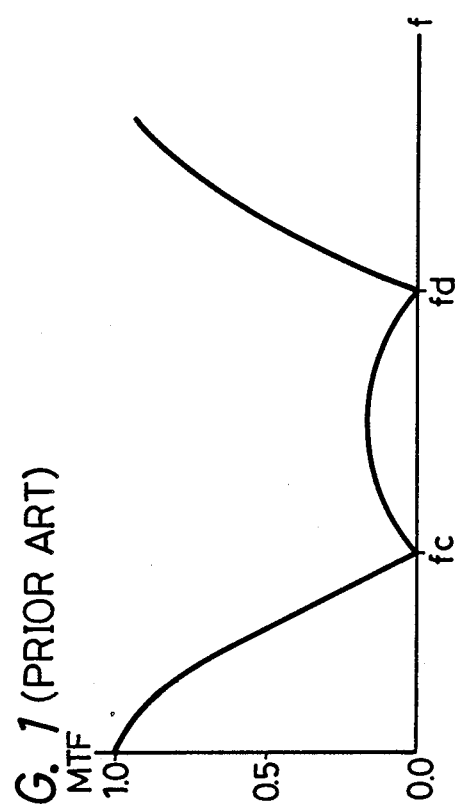
FIG. 1 is a graph illustrating the MTF characteristic of a previously proposed optical low-pass filter.

Considering now the angle θ at which the axes x′ and y′ of the periodic structures 1 and 2, respectively, are angularly displaced from the directions x and y, respectively, it will be appreciated that, in the case where the periodic structures 1 and 2 are arranged perpendicular or at right angles to each other and have the same periodic length or pitch $P_0$ so as to have substantially the same characteristics, the MTF characteristic of the optical low-pass filter in both the direction x and the direction y will be substantially the same as that shown on FIG. 1 if the angle θ is small or 0°. On the other hand, if the angle is large, the cut-off spatial frequencies $f_{1c}$ and $f_{2c}$ on FIG. 3 approach each other with the result that the MTF in the frequency range below the cut-off spatial frequency is lowered and the susceptibility to the generation of false signals is increased. Further, if the angle θ is large, the resolution in each of the directions x and y on FIG. 2 is considerably decreased.

It has been found that the angle θ is desirably selected to be within the range from approximately 10° to 40°, and is preferably about 25° for the case where the periodic structures 1 and 2 have substantially the same characteristics and are arranged at approximately right angles to each other. However, the value of the angle may depart from the foregoing range in those cases where the periodic structures 1 and 2 have substantially different characteristics and/or are arranged at substantially other than right angles relative to each other.

In the embodiment of the present invention described above with reference to FIGS. 2 and 3, although the periodic structures 1 and 2 have the same periodic length or pitch $P_0$ measured in the directions of their axes x′ and y′, respectively, the angular displacement of such axes x′ and y′ from the horizontal scanning direction x and the vertical direction y by the angle θ within the range from approximately 10° to 40° ensures that the MTF in the direction x or the direction y, as well as in a direction therebetween, will be, for frequencies less than the cut-off spatial frequency, maintained higher than a predetermined value expressed by a straight line d extending between the point of MTF =1.0 for 0 frequency and the point of MTF =0.0 at the cut-off spatial frequency $f_{1c}$, as shown on FIG. 3. Further, the area in which the MTF is low, that is, no higher than 0.3, is increased to extend to frequencies well above twice the cut-off spacial frequency. By reason of the foregoing conditions, the attainment of a picture of high contrast and decreased false signals is ensured. However, it is not absolutely necessary that the value of the MTF be maintained above the line d for the entire range of frequencies below the cut-off spacial frequency $f_{1c}$. More particularly, the effectiveness of the optical low-pass filter according to the invention is not substantially deteriorated if the value of the MTF is slightly lower than the values represented by the straight line d at frequencies only slightly lower than the cut-off spatial frequency $f_{1c}$, or if the contrast of the picture is otherwise protected from being affected by the MTF having values lower than that represented by the straight line d.

Although the MTF of the optical low-pass filter embodying this invention is to some extent dependent on the wavelength of light passing therethrough, the MTF characteristic shown on FIG. 3 is representative of a typical MTF characteristic for a wavelength within the range of wavelengths for which an optical low-pass filter according to this invention is likely to be used.

Figure 4A:
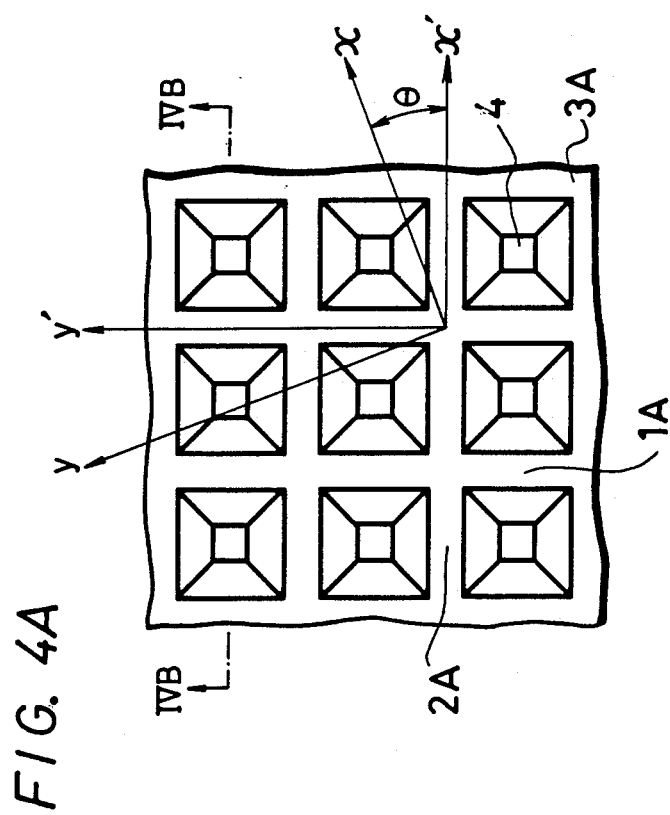
FIG. 4A is a plan view of a portion of an optical low-pass filter according to another embodiment of the present invention.
Figure 4B:
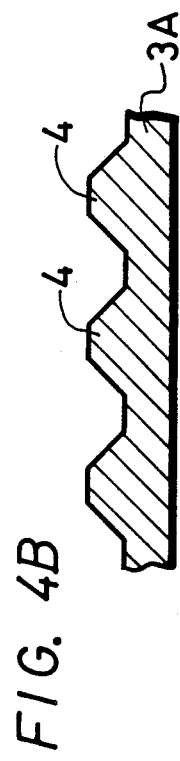
FIG. 4B is a fragmentary sectional view taken along the line IVB–IVB on FIG. 4A.

In the embodiment of the invention described above with reference to FIG. 2, the two periodic structures 1 and 2 are formed on opposed major surfaces of the transparent substrate 3. However, as shown on FIGS. 4A and 4B, in an optical low-pass filter according to another embodiment of the present invention, the first and second periodic structures indicated at 1A and 2A, respectively, on FIG. 4A, may be provided on one of the major surfaces of a transparent substrate 3A. More particularly, in the embodiment illustrated by FIGS. 4A and 4B, the first and second periodic structures 1A and 2A are defined by a regularly arranged pattern of projections 4 extending from one major surface of the transparent substrate 3A and being spaced apart in rows directed parallel to the directions of the axes x' and y' which, as in the case of the embodiment of FIG. 2, are displaced by the angle $\theta$ from the horizontal scanning direction x and the vertical direction y, respectively. Each of the projections 4 may be desirably in the form of a frustum of a pyramid. As before, the angle is selected to be in the range from approximately 10° to 40° when the MTF characteristics of the periodic structure 1A in the direction of the axis x' and of the periodic structure 2A in the direction of the axis y' are substantially the same. In such case, the synthesized MTF characteristic in the direction x or the direction y of the optical low-pass filter shown on FIGS. 4 and 4B is substantially the same as that indicated by the dot-dash line c on FIG. 3. Therefore, the optical low-pass filter of FIGS. 4A and 4B has substantially the same functional advantages as those previously described with reference to the embodiment of FIG. 2.

Figure 5:
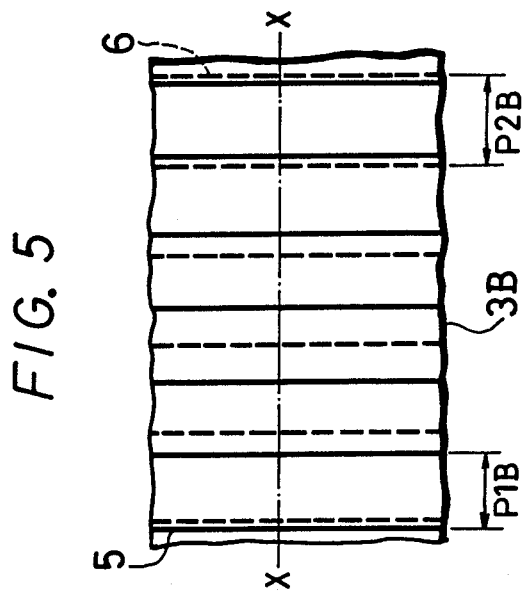
FIG. 5 is a schematic representation of an optical low-pass filter according to still another embodiment of the present invention.

In the embodiments of the invention described above with reference to FIG. 2 and FIGS. 4A and 4B, the periodic structures 1 and 2 or 1A and 2A have the same periodic lengths or pitches $P_0$ and the effective periodic lengths or pitches of the first and second periodic structures relative to the direction x or the direction y are made different by angularly displacing the axes x' and y' from the directions x and y, respectively, by the angle $\theta$. However, as shown on FIG. 5, an optical low-pass filter according to still another embodiment of this invention may employ periodic structures 5 and 6 which have different periodic lengths or pitches P1B and P2B, respectively. More particularly, in the embodiment of FIG. 5, the periodic structure 5 having the pitch P1B and the periodic structure 6 having the pitch P2B are provided on opposed major surfaces of a transparent substrate 3B and extend in the same direction which, for example, is shown to be at right angles to the horizontal scanning direction x. It will be appreciated that the optical low-pass filter of FIG. 5 is operative to provide the desired MTF characteristic only in approximately the direction x. In such case, the MTF characteristic of the periodic structure 5 may be substantially as indicated by the solid line a on FIG. 3, while the MTF characteristic of the periodic structure 6 is substantially as represented by the dashed line b on FIG. 3, so as to result in a synthesized MTF characteristic for the optical low-pass filter embodying this invention substantially as indicated by the dot-dash line c on FIG. 3. Once again, by reason of such synthesized MTF characteristic represented by the dot-dash line c on FIG. 3, the optical low-pass filter of FIG. 5 is provided with the functional advantages previously described in respect to the embodiment of FIG. 2.

Although the optical low-pass filter according to each of the above described embodiments of the invention has only first and second periodic structures, it will be appreciated that optical low-pass filters according to the invention can have more than two such periodic structures on one or more transparent substrates. Thus, for example, an optical low-pass filter according to the invention may comprise a first transparent substrate formed with first and second periodic structures on its opposite major surfaces, and a second transparent substrate formed with third and fourth periodic structures on its opposite major surfaces. In such case, the periodic structures on the two transparent substrates may be angularly displaced relative to each other or aligned and may have the same or different pitches so as to obtain the desired synthesized MTF characteristics in various directions.

By way of summary, it is to be noted that, in phase noise type optical low-pass filters according to this invention, at least first and second periodic structures are dimensioned and arranged in respect to each other so that the MTF in at least one direction, for example, the horizontal scanning direction, is higher than a predetermined value for frequencies in the range lower than the cut-off spatial frequency, and further so that the MTF is low over a range of frequencies extending from the cut-off spatial frequency to substantially more than twice such cut-off spatial frequency. In other words, the rising up of the MTF in the range of frequencies greater than $f_{1d}$ (FIG. 3) is made gentle. By reason of the foregoing, it is possible to obtain from the associated color video camera a picture of high contrast and reduced false signals.

Although illustrative embodiments of the invention and specific modifications thereof have been described in detail above, it will be apparent that the invention is not limited to those specifically described embodiments and modifications, and that various further changes and variations can be effected therein by one skilled in the art without departing from the scope or spirit of the invention as defined in the appended claims.

What is claimed is:

1. In an optical system of a color video camera having a horizontal scanning direction, an optical low-pass filter comprising:

a transparent substrate having opposed first and second major surfaces, means on at least one of said major surfaces of the substrate for defining first and second periodic structures having respective first and second axes which are angularly displaced from each other and from said horizontal scanning direction, said first and second periodic structures having the same periodic lengths measured in the directions of said first and second axes, respectively, and said first and second axes being orthogonally related with said first axis angularly displaced from said horizontal scanning direction by an angle in the range from approximately 10° to 40° so that first and second periodic structures have different effective periodic lengths measured in said horizontal scanning direction.

2. In an optical system of a color video camera, an optical low-pass filter according to claim 1; in which said angle is approximately 25°.

3. In an optical system of a color video camera having a horizontal scanning direction, an optical low-pass filter comprising:

a transparent substrate having opposed first and second major surfaces, means on at least one of said major surfaces of the substrate for defining first and second periodic structures, said first and second periodic structures extending parallel to each other at an angle to said horizontal scanning direction, and said first and second periodic structures having different periodic lengths measured transversely to said first and second periodic structures, respectively.

4. In an optical system of a color video camera, an optical low-pass filter according to claim 3; in which said first and second periodic structures are formed on said first and second major surfaces, respectively, of the substrate.

5. In an optical system of a color video camera having a horizontal scanning direction, an optical low-pass filter comprising a transparent substrate having opposed first and second major surfaces, means on at least one of said major surfaces for defining a first periodic structure having a first effective periodic length measured in said horizontal scanning direction and for defining a second periodic structure having a second effective periodic length measured in said horizontal scanning direction and which is substantially different from said first effective periodic length; said first and second periodic structures having respective orthogonally related first and second axes and the same periodic lengths measured in the directions of said first and second axes, respectively, and said first axis being angularly displaced from said scanning direction by an angle in the range from approximately 10° to 40° so as to provide said different first and second effective periodic lengths.

6. In an optical system of a color video camera, an optical low-pass filter according to claim 5, in which said first and second periodic structures are both formed on said one major surface of said substrate.

7. In an optical system of a color video camera, an optical low-pass filter according to claim 5; in which said first and second periodic structures are formed on said first and second major surfaces, respectively.

* * * * *